United States Patent [19]

Cornelius, III

[11] 4,346,017

[45] Aug. 24, 1982

[54] METHOD FOR CONTROLLING BOILER WATER FOAMING

[75] Inventor: Thomas E. Cornelius, III, Coraopolis, Pa.

[73] Assignee: Calgon Corporation, Pittsburgh, Pa.

[21] Appl. No.: 131,583

[22] Filed: Mar. 19, 1980

[51] Int. Cl.[3] .............................................. B01D 19/04

[52] U.S. Cl. ..................................... 252/321; 252/358

[58] Field of Search ................................ 252/321, 358

[56] References Cited

U.S. PATENT DOCUMENTS

| | | | |
|---|---|---|---|
| Re. 24,473 | 5/1958 | Denman | 252/77 X |
| 2,346,928 | 4/1944 | Lighthipe | 252/321 X |
| 2,390,212 | 12/1945 | Fritz | 252/358 X |
| 2,428,776 | 10/1947 | Bird et al. | 252/321 |
| 2,575,276 | 11/1951 | Jacoby et al. | 252/321 |
| 2,600,361 | 6/1952 | Gunderson | 252/321 |
| 3,677,963 | 7/1972 | Lichtman et al. | 252/358 |

FOREIGN PATENT DOCUMENTS

| | | | |
|---|---|---|---|
| 902854 | 6/1972 | Canada | 252/358 |

*Primary Examiner*—Richard D. Lovering
*Attorney, Agent, or Firm*—Martin L. Katz; R. Brent Olson

[57] ABSTRACT

Use of low saponification number vegetable and mineral waxes as boiler water antifoams.

3 Claims, No Drawings

METHOD FOR CONTROLLING BOILER WATER FOAMING

This invention is directed to boiler water antifoam compositions.

More particularly, this invention is directed to the use of low saponification number waxes in boiler water antifoam compositions.

Foaming and carryover in industrial boiler systems are serious problems that can cause deposition and eventual failure of superheater tubes and deposition on steam turbine internal parts which may result in costly shutdowns for cleaning and repair. In some cases, the problem may be corrected by mechanical changes or improved boiler control. Where the cost of mechanical changes is prohibitive, chemical antifoam compositions may be used. Heretofore, most chemical antifoam compositions have contained as their essential ingredient the reaction products of fatty acids and amines, castor oil or polyalkylene glycols. These chemical antifoam compositions have, however, suffered from several disadvantages, as for example, inadequate useful life or additional saponification.

Accordingly, it is an object of this invention to provide a new, effective boiler water antifoam composition.

It is another object of this invention to provide a boiler water antifoam composition which performs effectively for extended periods of time.

It is a further object of this invention to provide a boiler water antifoam composition where performance is substantially unaffected by thermal degradation.

These and other objects of this invention are accomplished by providing a boiler water antifoam composition which contains as its essential ingredient a low saponification number, high melting point, vegetable or mineral wax, such as carnauba wax, candelilla, ouricury, sugar cane or montan. The term "low saponification number wax" means any wax having a saponification number of less than 100. The term "high melting point" means 70° C. or higher.

The boiler water antifoams of this invention may be used in concentrations of from 0.1 to 1000 ppm, preferably 0.1 to 10.0, based on the boiler feedwater. They may be used alone or in combination with other boiler additives, such as chelates, as for example, nitrilotriacetic acid and ethylenediaminetetraacetic acid; phosphates, such as sodium hexametaphosphate; and phosphonates, such as amino tris (methylene phosphonic acid) and hydroxyethylidene diphosphonic acid.

The utility of the boiler water antifoams of the present invention will be illustrated by the following representative examples.

EXAMPLE 1

A stock solution synthetic boiler water was made with the following formula:

5.4 gm/l $Na_3PO_4.12H_2O$
6.5 gm/l $Na_2SiO_3$
2.8 gm/l NaCl
22.8 gm/l $Na_2SO_4$
35.0 gm/l NaOH
25.0 gm/l $Na_2CO_3$

For use in the antifoam tester, the stock solution was diluted 10:1 with deionized water resulting in adequate foam generation to screen viable antifoam candidates. A sample of refined grade carnauba wax, with a melting point of 85° to 90° C. was formulated as a stable 5 percent emulsion by adding 50 grams of carnauba wax, 2.5 grams of tetraethylene pentamine and 5.0 grams of sodium metasilicate to 942.5 grams of deionized water which had been heated to 90° C. and stirred with a magnetic stirring bar until all the wax had melted. The beaker was removed from the heat and agitation was continued until the solution had cooled. The resulting emulsion was diluted to 0.5 percent active and remained stable. Testing via the antifoam test device, which is a dynamic test system, showed this compound to be equally as effective as several commercially available products.

EXAMPLE 2

Additional tests were conducted on a Dynamic Boiler Monitor in which the boiler makeup water consisted of 25 percent Robinson Township tap water and 75 percent deionized water yielding a total hardness of 40 ppm as $CaCO_3$, a pH of 7.5 and a conductivity of 140 μmhos. The chemical feed tank was made with the following chemical concentrations:

5 gm/l $Na_2SO_3$
4.5 gm/l sodium hexametaphosphate
1.5 gm/l sodium metasilicate
4.5 gm/l NaOH
2.0 gm/l $Na_2SO_4$
1.0 gm/l NaCl Tests were run by deliberately concentrating the chemical feed in the boiler system during the filling procedure. The boiler system was filled with approximately $\frac{1}{3}$ chemical feed and $\frac{2}{3}$ makeup resulting in high solids (7000 μmhos conductivity) and high alkalinity (930 mg/l NaOH). The powerstat was set at 95 percent and when the boiler water came to a rolling boil with adequate foam, the chemical feed was adjusted to feed the normal amount of chemical to the system. To test antifoam products, 5 milligrams of the 5.0 percent antifoam product were added to 995 milligrams of chemical feed solution in a one-liter graduate and the chemical feedline added to the graduate. Based on a chemical feed rate of 90 milligrams/hour and a volume of approximately 50 milligrams to fill the entire feedline, approximately $\frac{1}{2}$ hour was required for antifoam to enter the system. The first test was run with 0.5 percent polyalkylene glycol for control and within $\frac{1}{2}$ hour, the rolling foam had been quelled. It is difficult to determine the exact amount of antifoam required as the defoaming action occurs immediately upon the first increment of antifoam entering the system.

The carnauba wax emulsion was as effective as the polyalkylene glycol at equivalent feed rates. This test was repeated several times for confidence.

EXAMPLE 3

Thermal Degradation Studies

One-liter samples of 0.5 percent polyalkylene glycol and 0.5 percent carnauba wax emulsion were prepared and each was autoclaved at 2000 PSIG for a four-hour period, at which time, the heat was turned off and agitation in autoclave continued until the samples cooled (overnight). Samples of the autoclaved material, along with control samples, were submitted to the Analytical Department for I.R. examination to determine thermal breakdown. Severe breakdown occurred in all autoclaved samples. The polyalkylene glycol sample showed evidence of hydrolysis by the cleavage of ether linkages and the carnauba wax emulsion showed decarboxylation. Additional samples of each product were made and autoclaved at 300, 500 and 1000 PSIF, respectively. Those samples autoclaved at 300 and 500 PSIG were submitted to Analytical Services for I.R. examination and results indicate that there is moderate degradation of the carnauba wax emulsion. There was no evidence of degradation of the polyalkylene glycol material. After standing overnight, however, the polyalkylene glycol material showed extensive settling of solids and the carnauba wax emulsion remained stable.

When retested on the Dynamic Boiler Monitor, all samples proved effective as antifoam agents, including those previously autoclaved at 1000 PSIG.

I claim:

1. A method for controlling boiler water foaming which comprises maintaining in said boiler water from 0.1 to 1000 ppm of a boiler water antifoam composition which consists essentially of a vegetable or mineral wax having a saponification number of less than 100; and at least one member selected from the group consisting of chelates, phosphates and phosphonates.

2. A method as in claim 1 wherein the wax is carnauba wax.

3. A method as in claim 2 wherein the carnauba wax is formulated as an emulsion.

* * * * *